United States Patent [19]

Gaüs et al.

[11] Patent Number: 4,589,047
[45] Date of Patent: May 13, 1986

[54] PROTECTIVE MECHANISM IN ELECTRICALLY OPERATED DEVICES

[76] Inventors: Harry Gaüs, Schwanheimerstr. 93, Bensheim, Fed. Rep. of Germany, D-6140; Hagen Gross, Am Zollstock 29, Bad Homburg, Fed. Rep. of Germany, D-6380

[21] Appl. No.: 557,153
[22] PCT Filed: Mar. 4, 1983
[86] PCT No.: PCT/EP83/00062
 § 371 Date: Nov. 7, 1983
 § 102(e) Date: Nov. 7, 1983
[87] PCT Pub. No.: WO83/03160
 PCT Pub. Date: Sep. 15, 1983

[30] Foreign Application Priority Data
 Mar. 6, 1982 [DE] Fed. Rep. of Germany ....... 3208147
 Sep. 24, 1982 [DE] Fed. Rep. of Germany ....... 3235366

[51] Int. Cl.[4] .............................................. H02H 5/04
[52] U.S. Cl. ......................................... 361/42; 361/49
[58] Field of Search ................................... 361/42–50, 361/1, 104, 178; 337/401–406, 407, 411–416, 145, 150, 174, 176, 195, 186, 143, 144, 152, 153; 340/602, 603, 604, 605; 338/35

[56] References Cited
U.S. PATENT DOCUMENTS

| | | | |
|---|---|---|---|
| 2,863,021 | 12/1958 | Green | 337/145 |
| 3,407,840 | 10/1968 | Finnegan | 361/178 X |
| 3,525,902 | 8/1970 | Davidson et al. | 361/178 |
| 3,629,766 | 12/1971 | Gould, Jr. | 337/407 X |
| 3,948,143 | 4/1976 | Olsen | 337/416 X |
| 4,044,224 | 8/1977 | Jenkins et al. | 361/42 X |
| 4,085,397 | 4/1978 | Yagher, Jr. | 337/407 |
| 4,103,319 | 7/1978 | Crain et al. | 361/178 X |
| 4,112,312 | 9/1978 | McGalliard | 361/178 X |
| 4,263,576 | 4/1981 | Murata et al. | 338/35 |
| 4,270,158 | 5/1981 | Gilardoni et al. | 361/42 |
| 4,328,387 | 5/1982 | Kemble | 337/407 X |

Primary Examiner—Harry E. Moose, Jr.
Attorney, Agent, or Firm—Holman & Stern

[57] ABSTRACT

To protect the operator of an electrically powered apparatus in a damp room or in the presence of water or other electrically conductive fluid against an electric shock, there is provided a protective device comprised of a probe in the form of a double conductor which the user cannot contact when handling or operating the apparatus. In the presence of a conductive fluid the impedance of the probe changes. The probe is connected to the input of a trigger switch circuit which includes a semiconductor switch. The trigger circuit triggers the semiconductor switch when the impedance of the probe changes. The current which flows as a result of the closing of the semiconductor switch releases an automatically opening switch, the contacts of which lie in the incoming power supply wires of the apparatus, which contacts are normally held closed by means of a material which is fusible upon direct or indirect heating by means of said current.

19 Claims, 8 Drawing Figures

PROTECTIVE MECHANISM IN ELECTRICALLY OPERATED DEVICES

CROSS REFERENCE TO RELATED APPLICATION(S)

This U.S. application stems from PCT International Application No. PCT/EP83/00062 filed Mar. 4, 1983.

BACKGROUND OF THE INVENTION

The invention relates to a protective device for an electrically powered apparatus, which device is comprised of an electronic switch which responds to any conductive fluid which may find its way into the housing of the apparatus, and is further comprised of a protective switch which can be triggered by said electronic switch, to protect the operator of the apparatus from receiving an electric shock.

Examples of electrically powered apparatuses of the type described are portable hair dryers, portable air heaters (fan-forced), sunlamps, "irradiation lamps", electric shavers, etc. There is a particular hazard in using such devices if they come into contact with water. Thus, for example, a fatal accident may result if a hair dryer falls into the water in a bathroom, even if the hair dryer is not being operated.

In the state of the art, protective devices of various types are known in which, when an electrical component of the apparatus which is passing a current comes into contact with moisture, an immediate interruption of the power supply is produced by the protective device, with the aim of preventing an electric shock.

According to a first group of prior art proposals, the interruption occurs over external leakage current protection switches (located outside the apparatus and in the house wiring), or over switching relays, or simply through the circuit protection system for the house wiring itself. Thus, in Ger. OS No. 26 31 785, a whirlpool bath device is described in which a measuring probe is mounted in the apparatus housing, which probe responds when moisture penetrates into the housing, and (said probe) brings about deenergization of a switching relay which is disposed outside the housing of the apparatus, e.g. in a wall plug, which relay connects the house wiring to the apparatus in a double pole switching arrangement. This known type of protective device requires special cables sic, special wall plugs, costly electronic control of the switching relay, and special measures to prevent re-energization of the relay and supply of line voltage before the precipitating hazard lit., "irregularity" has been removed.

According to a second group of prior art proposals, in response to the drawbacks of the external configuration the protective device is completely integrated into the electrically powered apparatus.

Thus, for example, it was proposed to switch in a silicon controlled rectifier (SCR) lit., "Triac" over the power supply lines of an electrical apparatus—i.e., to connect the SCR across said lines—with the three electrodes of the SCR being freely accessible in the interior of the apparatus. If the apparatus is immersed in water, the triggering electrode receives a triggering current, from ground or from one of the main electrodes (depending on the peculiarities of the installation and the phase situation in the (power supply) circuit), so that the SCR can be triggered and the power supply wires can be short circuited. This short circuiting in turn triggers the protective system for the house wiring, and shuts off power to the apparatus.

However, this arrangement violates international guidelines, which prohibit intentional short circuiting of the house wiring for the purpose of switching off an apparatus. Preconditions for trouble-free operation of the device include correct installation and fuse protection of the house wiring, and a sufficiently low impedance of the house wiring. Also, there are 220 V wiring systems having two fuse- or breaker-protected outer wires wherein only one of said wires, as a rule, is disconnected as a result of the response of a fuse or breaker protection means. In any case, the disconnection occurs simultaneously with the accident; i.e., the limitation of the electric shock to the user will depend on the time parameters of the house wiring system, and in any event a shock will not be completely prevented, since a direct connection (i.e., contact) between the water and the power supply circuit is a precondition for the production of the envisioned short circuit.

Another protective device is disclosed in Ger. OS No. 27 25 652. It involves measurement of the electrical impedance to ground of the human body; or the impedance to an outer wire of the power supply line, of said human body. For this purpose, the apparatus (appliance) has an electrically conducting contact surface, e.g., on a hand grip. This contact surface is connected to the line voltage via an electronic switch. Accordingly, if any component of this switch should fail, an additional risk would be possible.

Another precondition for proper operation is that the apparatus be connected to the house wiring in a specific manner not admitting of variation. Since most plug connectors (e.g. the "Europa" plug) do not have a set arrangement of the outer wire and the neutral wire, the unreasonable requirement is placed on the user of having to make the correct connection to the house wiring by trial and error.

Another disadvantage of this type of switch lies in the fact that the protective means also respond to a too-low impedance to ground, thus to an operating state in which there is no hazard for the user in the case of an apparatus of protective class II sic. In addition, this type of protective switch completely fails if an apparatus equipped with it comes into contact with water when it is connected with the wrong polarity to the house current; this situation was identified above as a typical cause of accidents. Under these conditions, the apparatus would not be able to operate, since the neutral wire would be disconnected, but the apparatus would still be capable of delivering a shock.

· SUMMARY OF THE INVENTION

The object of the invention is to devise a protective device of the type of the abovementioned second group of prior art proposals, which device will respond in an extremely short time independently of the polarity of the connection to the house wiring, and independently of the operating state of the apparatus, so as to protect the user from electric shock; and further, which device is capable of being miniaturized in a compact module containing its electronic and mechanical components, i.e. the number and size of such components are such that they are accommodatable in standard small electric appliances. The introduction of the protective device must not lead to lit., "contravene"—obvious error an excessively high price.

This object is achieved according to the invention by a combination of components having the following features:

(a) A probe at the boundaries of the housing openings and housing gaps, in the form of an open i.e., exposed electrical double conductor which is inaccessible during the handling of the apparatus but which changes its impedance when a conducting liquid is present;

(b) A trigger circuit comprising a semiconductor switch, said trigger circuit being connected at its input to the probe and serving to trigger the semiconductor switch when the impedance of the probe changes by a predetermined amount; and (c) An automatic-opening switch, mechanical or otherwise with contacts held closed under pre-stressing, with closure maintained by means of a material which fuses when indirectly or directly heated by means of a current which develops in the output loop of the trigger circuit when the semiconductor switch is triggered.

A probe in the form of a double conductor has been previously disclosed in connection with a protective device of the type of the abovementioned first group of prior art proposals, in Ger. OS 26 31 785 and U.S. Pat. No. 4,270,158; however, the arrangement is different there (see exemplary embodiment, infra). Automatic-opening mechanical switches with contacts held closed with the aid of materials which fuse when heated are known in various embodiments, for use as temperature-limiting switches (so-called "thermo-pills"). Their purpose is to cut off the supply of power as soon as an impermissibly high temperature is reached in the apparatus housing; they are not involved in protecting a user from electric shock.

With the combination of features according to the invention one has a protective device which disconnects the voltage of the house wiring on all poles, in the apparatus itself, in reliable fashion and in a very short time, when a conductive fluid such as water penetrates into the apparatus housing, and said device accomplishes this disconnection before the user can be connected to voltage-carrying exposed parts via the fluid which has entered the housing. This disconnection is irreversible, as a consequence of the construction of the switching system used, so that an apparatus which becomes wet cannot quickly thereafter be returned to operation.

An embodiment of the inventive trigger circuit which is particularly advantageous due to its low cost is characterized in claims, infra. As soon as the impedance of the double conductor is changed due to penetrating water, the thyristor is triggered, and a current passes through the resistance element, heating the latter to the required melting temperature within fractions of a second, so that the contacts of the protective switch which are under a pre-stressing holding them together break open, whereby the voltage to the entire apparatus is cut off. In comparison with known switches which are electromagnetically triggered, this arrangement has the advantage of extremely rapid response with low inertial lag. There is practically no danger of sticking or jamming or of spurious tripping as a result of mechanical shock. The necessary acceleration to bring about tripping through mechanical shock or impulse is of the order of magnitude of 1,000 times the acceleration of gravity.

A particularly reliable embodiment results if the trigger circuit is disposed in the apparatus between the protective switch and the load in such a way that when the switch is open all the components of the electrical circuit of the apparatus are not connected to a voltage—i.e., are switched off from the supply of voltage (namely, the house wiring).

There are various possibilities for the actual construction of the protective switch, depending on whether an electrical conductor or nonconductor is chosen as the fusible material to be employed.

In a first embodiment this fusible material is in the form of a fusible wire through which a current flows when the semiconductor switch of the trigger circuit is triggered.

In apparatuses (appliances) with low power rating, a single-pole protective switch may be employed, with the fusible wire employed in one of the power supply conductors and the set of spring contacts disposed in the other power supply conductor, whereby a semiconductor switch of the trigger circuit is inserted on the apparatus side and acts over both power conductors, i.e. an SCR is used as the semiconductor switch of the trigger circuit, with said SCR connected (downstream) to the apparatus via both power supply wires. In apparatuses with higher rated power, it is preferable to employ spring-loaded contacts in each of the power supply wires, so that each of the two power supply wires will contain a set (pair) of spring-loaded contacts associated with one pole of a 2-pole protective switch.

The embodiment described in the preceding paragraph, said embodiment employing a fusible wire has a certain disadvantage in that the fusible wire is fed directly from the house wiring, which has low source impedance, so that the current flowing through said fusible wire may attain a high value before the fusion point, expressed by the limiting value of the fusion integral, $I^2t$, is reached. This current will be over and above the operating load current of the apparatus which the protective switch must shut off, so that the mechanical protective switch must have the capacity to interrupt a relatively large overall current.

A second embodiment avoids this disadvantage. The features of this second embodiment are characterized in claims, infra. In it, a nonconducting material, in particular an adhesive material, is employed.

In the following the invention is described in more detail with the aid of a few exemplary embodiments.

DESCRIPTION OF THE PREFERRED EMBODIMENTS

Figure 1:
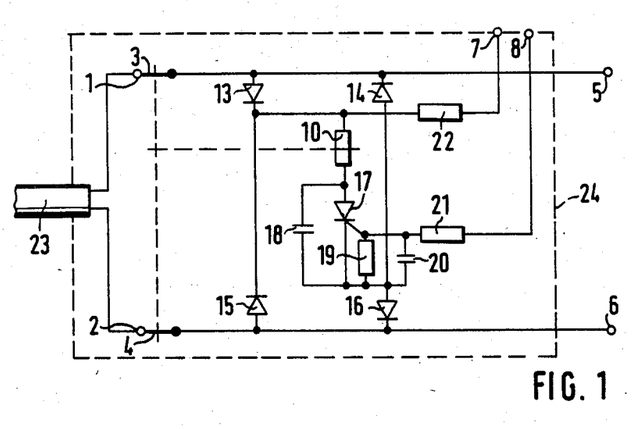
FIG. 1 is the schematic of a trigger circuit comprising a thyristor as the semiconductor switching element.

FIG. 1 shows the circuit diagram for a protective device according to the invention. The conductors of the power cord 23 are connected to terminals 1 and 2, from which terminals internal power connections of the apparatus run via spring contacts 3 and 4 of a two-pole protective switch to terminals 5 and 6, to which the operating load of the apparatus is connected. The spring contacts 3 and 4 of a 2-pole protective switch (FIGS. 4 to 6) are mechanically connected to a resistance element 10 which forms, in series with a thyristor 17, a diagonal of a diode quartet i.e., H-bridge 13 to 16. The capacitor 18 inserted in parallel with the thyristor 17 protects against overhead triggering of the thyristor in the event of power supply disturbances i.e., "spikes" or abnormal surges in line voltage. The RC network (19 and 20) prevents undesired triggering over the control electrode of the thyristor, which is connected via a high-ohm protective resistor 21 to one terminal 8 of the double conductor (not shown) of the probe (of FIG. 2). The other terminal 7 of the said double conductor is connected via a corresponding protective resistor 22 to the free end of resistor 10.

The smallest commercially available thyristor (0.5 A, 400 V) may be used. This has a highly sensitive control electrode, with a maximum triggering current of 0.2 mA. The high valued protective resistors 21 and 22 (of, e.g., 120 kOhm each) serve to limit the leakage current at the time of triggering to a safe value of, e.g., 1.8 mA.

Exemplary embodiments and the manner of operation of the protective device will be described hereinafter.

Figure 2:
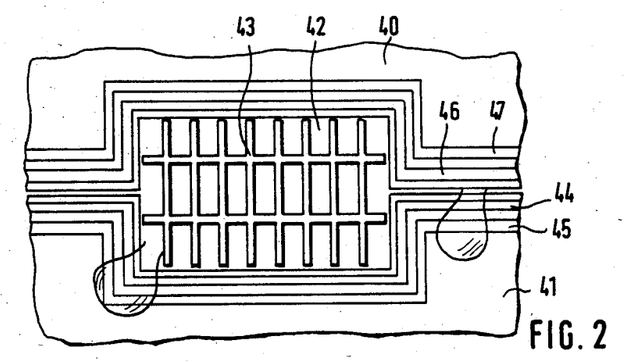
FIG. 2 shows the configuration of an electrical double conductor as a probe to detect water which has penetrated, said double conductor being shown in perspective, viewed from the interior of the housing of a hair dryer, in the direction of the air exit opening of said dryer.

FIG. 2 is a simplified representation of the configuration of the electrical double conductor of the probe for detecting penetrating water. The view is from the interior of the housing of, e.g., a hair dryer, looking in the direction of the air exit opening of said hair dryer. The two housing elements 40 and 41 have a gap between them, and are also separated to form the air exit opening 42 in which a touch-guard grating 43 is installed. Around this opening and along the gap in the housing, electrically conducting strips 44, 45, 46, and 47 are mounted. These may be applied to the interior surfaces of the two housing elements 40 and 41 by printing on a conducting lacquer or by injection-molding a suitable conducting material onto said surfaces in a two-phase injection molding process. Under normal handling and operation of the apparatus, these strips are not accessible, and are recessed from the edges of the housing at least to the extent of the prescribed air passage space and surface leakage clearance. By configuring these strips appropriately, it can be ensured that water which penetrates through the opening or through the gap in the housing cannot produce an electrical contact forming a current path from any interior part of the apparatus carrying a voltage to any point lying outward of such interior part, without said water wetting the strips. With the wetting of the strips the penetrated water causes the conductance of the path between the strips to increase sharply, with the result that—as described—the thyristor of the trigger circuit is triggered (FIG. 1).

The electrically conducting strips 44 to 47 can be applied by printing-on a conducting lacquer or by injection-molding a suitable conducting material onto the interior surfaces of the two housing elements 40 and 41, employing (for the injection molding) a 2-phase injection molding process.

Figure 3:
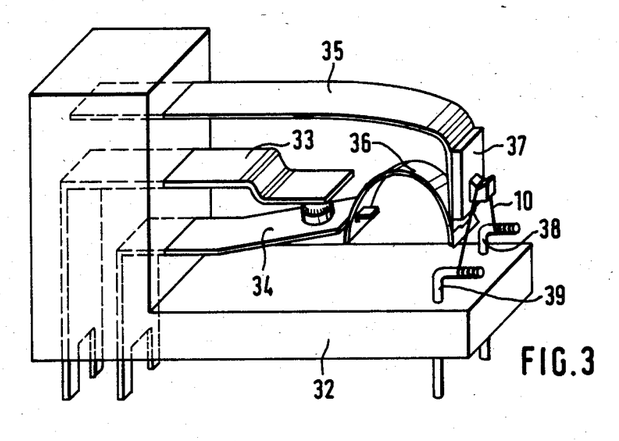
FIG. 3 shows a single-pole protective switch, with its spring-loaded contact pair held in place by means of a fusible wire.

FIG. 3 shows a single-pole automatic-opening mechanical switch with release by means of a fusible wire. A rigid contact spring 33, a movable contact spring 34, and a spring clip also means "spring-acting bent piece" 35 are molded into a plastic base 32. Together with the bent spring/lit., "elastic spring"/36, these parts form a so-called "bent spring contact", which is itself known. The contact closes as soon as the spring clip 35 is pressed downward, and the contact opens as soon as the spring clip 35 is released upward. In order to achieve this automatic opening, the spring clip 35 is pre-tensioned in such a way that, when released, it assumes its upper rest position, with attendant opening of the contacts. A plastic anchor 37 is molded onto the forward end of the spring clip. A fusible wire 10 is passed over this anchor and attached to the two pins 38 and 39 by a wire-winding technique.

Figure 4:
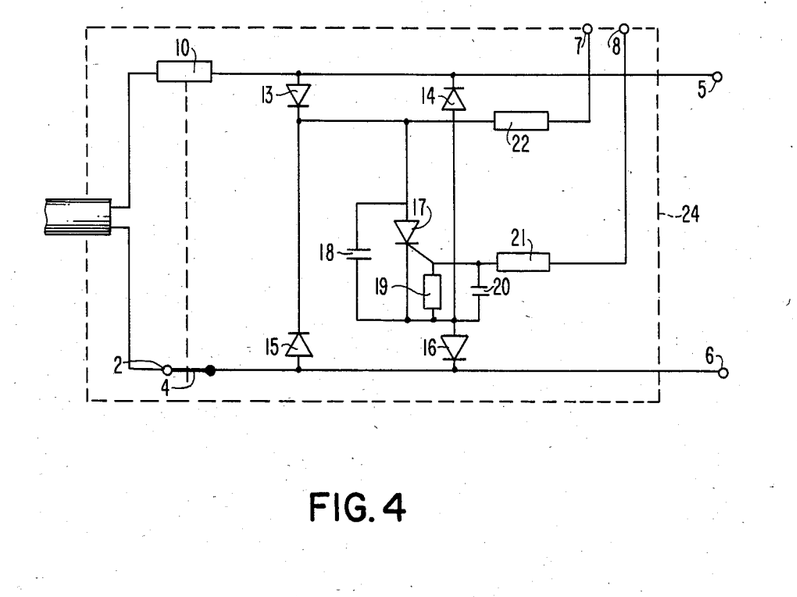
FIG. 4 shows a variant of the trigger circuit of FIG. 1, for the protective switch of FIG. 3 as described below.

With this switch, one of the power supply wires is connected to the operating load of the apparatus via the two pins 38 and 39, and the other via the two springs 33 and 34. FIG. 4 shows the associated triggering circuit, derived from that of FIG. 1 applicable to a second embodiment. The dimensions of the fusible wire 10 must be such that it can carry the nominal current of the apparatus without danger of spurious tripping of the mechanical switch. A particularly suitable material for such wires is phosphor bronze, since it has high tensile strength along with a relatively low melting point. It is important to note that in this embodiment the fusible wire should actually break, i.e. electrical discontinuity, upon excitation for maximum safety.

This embodiment has the advantage of being very inexpensive and reliable. It has the advantage over known switches which are electromagnetically tripped that it responds extremely quickly (with low inertial lag).

The capacity of the protective switch will be illustrated in the following dimensioning example: For an apparatus with a nominal current below 0.1 A, e.g. an electric razor, a fusible wire of diameter 0.04 mm might be used, having a tensile strength of 1.2. The tripping current is about 0.25 A, so that even assuming the least favorable case of tripping when the line voltage is momentarily zero (passing through zero) a melting time of only about 0.2 msec is to be expected. The arrangement of the fusible wire 10 in a loop (FIG. 3) doubles to capacity to $2 \times 1.2N = 2.4N$ and allows the spring clip 35 to be set up so that it exerts a force of 1N tending to force the switch open. The inertial mass on which the spring clip acts is about 0.3 g, so that the contact-opening acceleration produced by the spring clip arrangement is about 330 times gravitational. As a result, the time from the tripping of the trigger switch circuit to the complete opening of the switch of FIG. 3 is about 1.3 msec. With an electromagnetically tripped switch, tripping times this short are not attained, since the ratio of the accelerating force to the inertial mass with such systems is always smaller than with the system of the invention which operates purely with spring forces.

The electrical double conductor of the probe should be configured in such a way that the trigger switch circuit will respond before the penetrating water reaches any other parts of the electrical apparatus which have a voltage on them (e.g., the heating coil, in the case of a hair dryer). If a hair dryer falls, e.g., into a bathtub, its speed of movement will not exceed a few meters per second, so that the speed of penetration of the water into the apparatus can be at most a few millimeters per millisecond. For the stated tripping speed of 1.3 msec (see supra) for the protective switch, the minimum distance required between the electrical double conductor of the probe and the voltage-carrying parts of the apparatus will be 10 mm.

Figure 5:
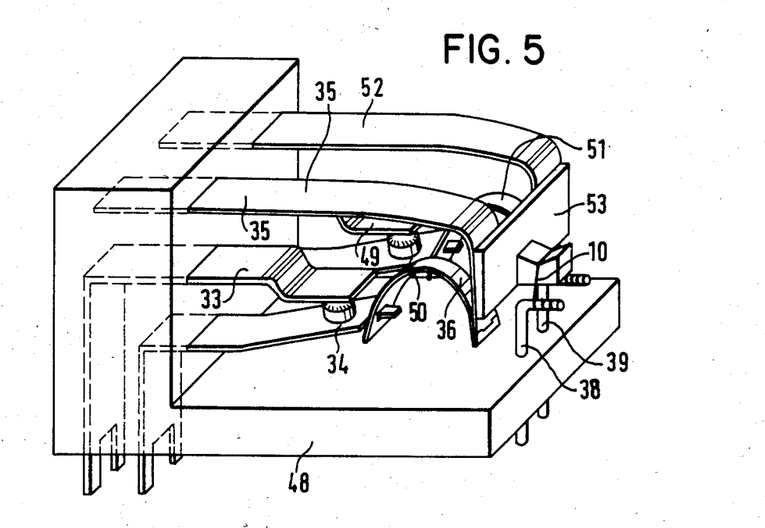
FIG. 5 shows a 2-pole embodiment of the protective switch of FIG. 3.

FIG. 5 shows a 2-pole protective switch with the same construction as that of FIG. 3, but having a "bent spring contact" for each of the two electrical conductors (cf. FIG. 1). The first switch, comprising parts 33 to 36, and the second switch, comprising the parts 49 to 52, are both disposed on the single plastic base 48. An anchor plate 53 of a plastic material is molded onto the end faces of the two spring clips 35 and 52, and joins these faces together. In the normal state the anchor plate 53 is held in a lowered position by a fusible wire 10 which is wound around pins 38 and 39, whereby both of the switches are closed (i.e., in a closed state). The dimensions of the fusible wire 10 are independent of the operating current drawn by the apparatus, since that current does not pass through the fusible wire, and thus one does not need to consider changes which might be caused by constant thermal stresses on the wire, which stresses would result from such current. This protective switch can be employed in a trigger circuit according to FIG. 1, as may be clearly seen.

Figure 6:
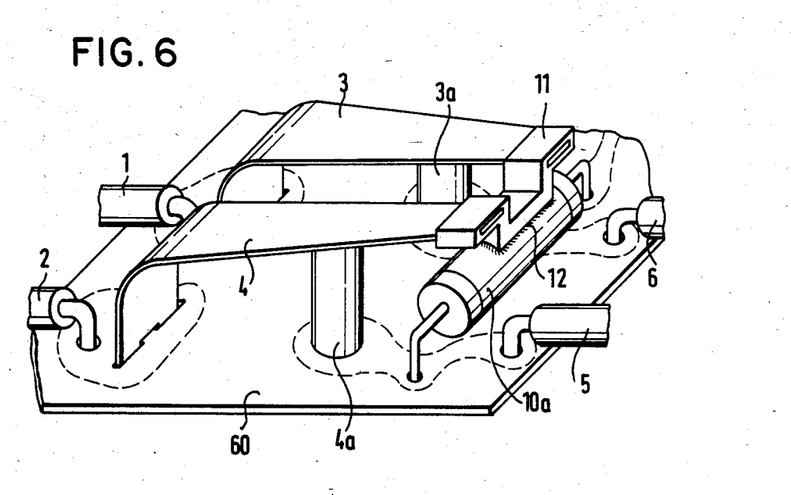
FIG. 6 shows a protective switch with a cylindrical resistance element and adhesion.

FIG. 6 shows another embodiment of a 2-pole protective switch, having contact springs which are adhesively fastened to a resistor. Two bent contact springs 3 and 4 are attached to a printed circuit board 60. The free ends of said springs are joined together by means of a yoke 11 comprised of a plastic material. In the downwardly bent state, the springs make contact with contact rods 3a and 4a which are mounted in the printed circuit board 60. The yoke 11 is joined to a resistor 10a by means of an adhesive material 12. As soon as the probe (not shown) registers a hazard due to penetration of water, the resistor 10a (described earlier as a resistor 10 in connection with FIG. 1) is connected to the house wiring system. The resistance and heat capacity of the resistor 10a may be adjusted with respect to each other such that within 0.5 to 2 msec (depending on the phase situation) a temperature is reached (about 200° C.) which causes the adhesive to fail, whereupon the contact springs 3 and 4 will spring upward, and the power connections from terminals 1 and 2 to terminals 5 and 6 respectively (FIG. 1) will be broken. An appropriate ratio of force to mass in the contact springs 3 and 4 will result in opening of the switches before the resistor 10a can fuse or blow out.

A test model employed a commercially available 330 ohm wirewound resistor of dimensions 2 mm diameter×6 mm long, with a fiberglass winding-core, and an open (i.e., exposed) single-layer wire winding. The winding was coated locally with a thin layer of a fusible adhesive, e.g. sic a cyanoacrylate adhesive or a polyamide adhesive.

The yoke 11 ensures that, regardless of any unevenness of the adhesive material, after a tripping event both of the contact springs will swing upward together, and will forcefully open both switch contact sets lit., "both contact locations". In order to provide maximum opening speed, the yoke is kept as light as possible. Also, the materials and their configuration should be chosen such that ohmic heating, "heating due to energy loss" which is produced in the event of high current loading of the contact points 3/3a and 4/4a does not result in heating of the adhesive location 12. The tapered form of the contact springs 3 and 4 is also aimed at increasing the speed of opening by reducing the mass. The following data were generated by the model: After the semiconductor switch was triggered, a current of 0.67 A developed in the device. This is small in relation to the nominal operating current of 6.8 A in a 1500 W hair dryer. The load of 146 W average (290 W) in the wirewound resistor 10a heated the resistor to the melting temperature of the adhesive of about 120° C. within about 1 to 3 msec (depending on the phase situation at the beginning of the triggering), whereupon the adhesive joint separated. The initial force on the contact springs 3 and 4 was about 1.2 N, and the effective inertial mass was 80 mg. Accordingly, the initial acceleration was 1500 times the acceleration of gravity, and the time required for the contacts to open to a distance of 3 mm was about 1 msec. (During this time, the temperature of the wirewound resistor 10a may increase further, but not sufficiently to cause fusion or blowout, which would take many times longer than 1 msec.)

The disconnection time (time from triggering of the trigger circuit until opening of the mechanical switch contacts) may be reduced further by employing a thick film resistor, comprised of a thin, homogeneous resistance layer based on a metal oxide, applied to a flat ceramic plate. Such a resistor provides a more favorable ratio of the available pulse power to the heat capacity of the resistance layer and adhesive layer.

Figure 7:
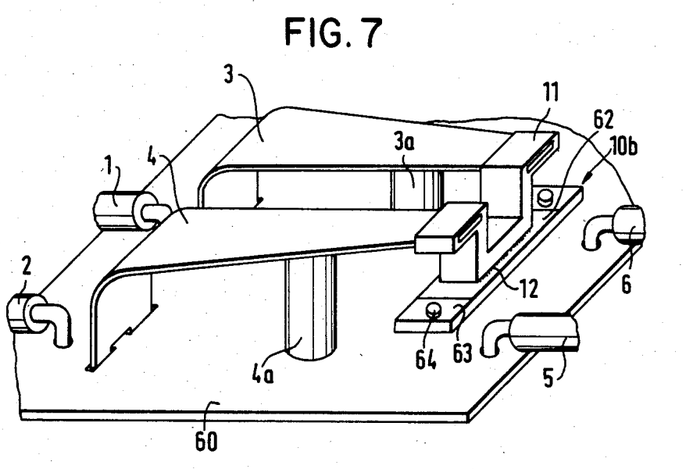
FIG. 7 shows a protective switch as in FIG. 6 but with a flat, thick-film resistor.

FIG. 7 shows such an embodiment of a protective switch, analogous to FIG. 6, with corresponding parts having been given corresponding reference numerals. Resistor 10b is comprised of a flat ceramic plate with a thin homogeneous resistance layer 62 and two metal-coated junction surfaces 63 with connectors 64. Such resistance elements are known, for example, from potentiometer technology. This embodiment has important advantages from the standpoint of manufacturing, and also operating reliability, namely in that the adhesive space between the yoke 11 and the resistance layer 62 is flat and has faces which are approximately parallel, so that the quality of the adhesive joint will be very uniform. Small horizontal dislocations between the parts which are to be joined adhesively together (said dislocations being due to mechanical tolerances) will not be harmful.

Figure 8:
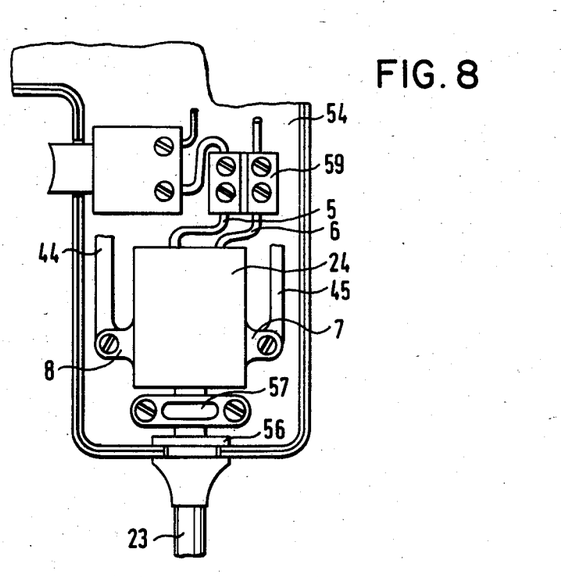
FIG. 8 shows the disposition of the protective device inside the hand grip of an electrically powered apparatus.

The protective switches according to FIG. 3 and FIGS. 5 to 8 may be of a particularly compact construction—the scale of the said Figures is approximately 5:1. The electronic components of the trigger switching system (FIG. 1) may be accommodated on the printed circuit board 60 of the protective switch, such as shown in FIGS. 6-8.

Due to the small size of these parts and the small number of components in the electronic circuit, it is possible to build the entire protective device into a unit which is unitary with the power cord.

FIG. 8 shows an exemplary embodiment comprising a power cord 23, a grommet 56, a cable clamp 57, and a hermetically sealed housing 24 containing the trigger switch system and the protective switch (namely, the elements contained within the dashed line boundary 24 of FIG. 1). The two power supply wires 5 and 6 on the apparatus side of housing 24 run from said housing to the porcelain clamp 59, and on the side (e.g., as continuations of the printed circuit board 60 shown in FIG. 5) the connectors 7 and 8 extend outward and join with the double conductor (44 and 45) which runs in the housing 24 sic—evidently should be "54"—obvious error (e.g., being printed onto said housing), by screw connections.

If a problem occurs and the protective switch is tripped, the operability of the apparatus can be restored by replacing the power cord 23 and device housing 24. If in serial production it is desired to manufacture apparatuses without protective devices as well as apparatuses with such devices, the power cord 23 may alternatively be clamped directly in the porcelain clamp 59.

The advantages of the inventive protective device lie in its very low manufacturing cost, its high reliability (due to the absence of complex mechanical interrelationships), its small number of component parts, and the protection it affords against undesired tripping (since the semiconductor switch 17 is decoupled via the resistance element 10), whereby the protective capacitor 18 is availed of first, before the semi-conductor switch is tripped, in the event of line surges.

Further, the protective switch in its various embodiments is insensitive to mechanical shock and vibration up to a level of over 1000 times the acceleration of gravity, as a consequence of the fact that the ratio of the retaining force (exerted by the fusible wire or adhesive material) to the susceptible inertial mass is very large. With an appropriate choice of the fusible material, a temperature insensitivity to temperatures even above 100° C. can also be attained. The switching properties of the device are not affected by the power supply impedance or the fuse system used with the power supply (house wiring).

The protective device is compact, e.g. 20×20×10 mm, which enables it to be installed even in small electrical appliances.

We claim:

1. A hazard prevention device for an electrical externally powered apparatus comprising:
    a housing, said housing having at least one opening and said housing comprising an electrical operating unit and a pair of spaced-apart electrically exposed electrically conductive probe networks, said pair being responsive to the entry of a conductive fluid electrically reducing the impedance between said probe networks of said pair;
    electrical source lines comprising at least one nonground electrical source line;
    a thermally actuated normally closed disconnect switch comprising at least one pair of normally closed contacts and an electrically conductive member, each said pair of normally closed contacts having a first contact and a second contact, said first contact being electrically connected to an electrical source line connection, said second contact connected to an electrical connection of said apparatus, each said pair of contacts being normally electrically closed in cooperation with said electrically conductive member, said member having two ends, one of said ends electrically connected to a nonground electrical source line of said electrical source lines, with at least each and every said first contact of each said pair of contacts which is associated with a respective nonground electrical source line being connected to its respective associated nonground electrical source line, with said thermally actuated normally closed disconnect switch operating so that upon electrical activity between said ends of said member through said member, termination of electrical conductivity between each and every said pair of normally closed contacts will occur;
    a trigger circuit comprising a semiconductor switch, said semiconductor switch having a first terminal, a second terminal, and a gate input, said gate input being excited only upon low impedance between said probe networks of said pair of probe networks, said semiconductor switch being electrically conductive between said first terminal and said second terminal only upon said gate input excitation;
    wherein entry of conductive fluid into said housing reduces said impedance between said probe networks of said pair causing said gate input excitation, which in turn causes said semiconductor switch to conduct between said first and second terminals, thereby providing electrical activity through said member causing said member to lose its ability to keep the normally-closed mechanical bias and associated electrical conductivity between said first contact and said second contact of each and every said pair of contacts, which in turn causes termination of electrical activity between said each said pair of normally closed contacts of said thermally actuated normally-closed disconnect switch, thus preventing injury to living species.

2. The hazard prevention device as defined in claim 1 wherein said electrically conductive probe networks are suitably positioned at least partly surrounding but always within the interior side of at least one of said openings.

3. The hazard prevention device as defined in claim 2 wherein said electrically conductive probe networks comprise a pair of spaced substantially parallel exposed electrical conductors.

4. The hazard prevention device as defined in claim 3 wherein each of said pair of spaced substantially parallel exposed electrical conductors comprise a printed-on conducting lacquer.

5. A hazard prevention device as defined in claim 1 further comprising a protective capacitor electrically in parallel with said semiconductor switch and connected between said switch's said first terminal and said second terminal.

6. The hazard prevention device as defined in claim 1 wherein said disconnect switch and said trigger circuit are mounted on a circuit board, plastic base, or the insulative like.

7. The hazard prevention device as defined in claim 1 wherein:
    said electrically conductive member further comprises:
        (a) an electrical resistor element suitably electrically insulated but not heat-insulated, said electrical resistor element generating heat only upon said gate input excitation, and (b) heat-decomposable adhesive;
    each said pair of said thermally actuated normally closed disconnect switches further comprises a pre-stressed contact spring, having a free end, with each said contact spring biased in the normally closed position to one of said contacts of each pair by heat-decomposable adhesive adhering each said contact spring free end to said electrical resistor element, and wherein said heat-decomposable adhesive decomposes upon said gate input excitation causing said free end of each contact spring to lose bias and electrically disconnect said free end of each contact spring from one contact of each pair of normally closed contacts.

8. The hazard prevention device as defined in claim 7 wherein said free end of each said contact spring is physically attached to an electrically insulating yoke, and said yoke is adhesively attached to said electrical resistor element by said heat-decomposable adhesive.

9. The hazard prevention device as defined in claim 7 wherein said heat-decomposable adhesive comprises a fusible nonconducting material.

10. The hazard prevention device as defined in claim 7 wherein said electrical resistor element comprises a thick film resistor.

11. A hazard prevention device for an electrical externally powered apparatus comprising:

a pair of spaced-apart electrically exposed electrically conductive probes, said pair being responsive to the entry of a conductive fluid electrically reducing the impedance between said probes;

electrical source lines, comprising at least one nonground electrical source line;

a normally closed disconnect switch comprising at least one pair of normally closed contacts and an electrically conductive member, each said pair of normally closed contacts having a first contact and a second contact, said first contact being electrically connected to an electrical source line connection, said second contact connected to an electrical connection of said apparatus, each of said pair of contacts being normally electrically closed in cooperation with said electrically conductive member, said member having two ends, one of said ends electrically connected to a nonground line of said electrical source lines, with at least each and every said first contact of each said pair of contacts which is associated with a respective nonground electrical source line being connected to its respective associated nonground electrical source line, with said normally closed disconnect switch operating so that upon electrical activity between said ends of said member through said member, termination of electrical conductivity between each and every pair of said normally closed contacts will occur;

a trigger circuit comprising a semiconductor switch, said semiconductor switch having a first terminal, a second terminal, and a gate input, said gate input being excited only upon low impedance between said probes of said pair of probes, said semiconductor switch being electrically conductive between said first terminal and said second terminal only upon said gate input excitation;

wherein entry of conductive fluid between said pair of probes reduces said impedance between said probes causing said gate input excitation, which in turn causes said semiconductor switch to conduct between said first and second terminals, thereby providing electrical activity through said member causing said member to lose its ability to keep the normally-closed mechanical bias and associated electrical conductivity between said first contact and said second contact of each and every pair of contacts, which in turn causes termination of electrical activity between said pairs of normally closed contacts of said normally-closed disconnect switch, thus preventing injury to living species.

12. A hazard prevention device for an electrical externally powered apparatus comprising:

a housing, said housing having at least one opening and said housing comprising an electrical operating unit and a pair of spaced-apart electrically exposed conductive probe networks, said pair being responsive to the entry of a conductive fluid electrically reducing the impedance between said probe networks of said pair;

electrical source lines comprising at least one nonground electrical source line;

a thermally actuated normally closed disconnect switch comprising at least one pair of normally closed contacts and a fusible electrically conductive member, each said pair of contacts having a first contact and a second contact, said first contact being electrically connected to an electrical source line connection, said second contact connected to an electrical connection of said apparatus, each said pair of contacts being normally electrically closed in cooperation with said fusible electrically conductive member, said member having two ends, one of said ends electrically connected to a nonground electrical source line of said electrical source lines, with at least each and every said first contact of each said pair of contacts which is associated with a respective nonground electrical source line being connected to its respective associated nonground electrical source line, with said thermally actuated normally closed disconnect switch operating so that upon electrical activity between said ends of said member through said member, termination of electrical conductivity between each and every said pair of normally closed contacts will occur;

a trigger circuit comprising a semiconductor switch, said semiconductor switch having a first terminal, a second terminal, and a gate input, said first terminal connected to one of said ends of said fusible electrically conductive member of said normally closed disconnect switch, said second terminal electrically connected to one of said electrical source lines other than the electrical source line connected to said end of said fusible member which is connected to said first terminal, said gate input being excited only upon a low impedance between said probe networks of said pair of probe networks, said semiconductor switch being electrically conductive between said first terminal and said second terminal only upon said gate input excitation;

wherein entry of conductive fluid into said housing reduces said impedance between said probe networks of said pair causing said gate input excitation, which in turn causes said semiconductor switch to conduct between said first and second terminals, thereby providing electrical activity through said fusible member to cause said member to lose its ability to keep the normally closed mechanical bias and associated electrical conductivity between said first contact and said second contact of each said pair of contacts, which in turn causes termination of electrical activity between each said pair of normally closed contacts of said thermally actuated normally-closed disconnect switch, thus preventing injury to living species.

13. The hazard prevention device as defined in claim 12 wherein said fusible electrically conductive member suffers an irreversible electrical discontinuity upon said gate input excitation.

14. A hazard prevention device as defined in claim 12 further comprising a protective capacitor electrically in parallel with said semiconductor switch and electrically connected between said first terminal and said second terminal of said switch.

15. A hazard prevention device as defined in claim 12 further comprising:
   a single-phase external electrical source having two electrical source lines, one of said lines being considered a ground line;
   a diode quartet bridge interposed between said electrical source lines and said apparatus comprising
      a first diode, a second diode, a third diode, and a fourth diode, each diode having a source and a drain terminal permitting current only from source terminal to drain terminal; said first diode connected to and conducting current in one direction from said nonground electrical source line to a diagonal first node which is connected to both:
         (a) that end of said fusible member which is not electrically closest to one of said terminals of said semiconductor switch of said trigger circuit, and
         (b) the drain terminal of said second diode, the source terminal of said first diode connected to said nonground electrical source line and to the drain of said third diode;
      said second diode having its source terminal electrically connected to:
         (a) said ground line and
         (b) said drain of said fourth diode
      said third diode whose source terminal is connected to a diagonal second node which is connected to the source terminal of said fourth diode, and
   wherein (a) between said diagonal first node and said diagonal second node electrically connected in series are said fusible electrically conductive member and said semiconductor switch, and
      (b) one of said probe networks is electrically connected to said diagonal first node and the other of said probe networks is electrically connected to said gate input of said semiconductor switch.

16. A hazard prevention device as defined in claim 15 and further comprising a protective capacitor electrically in parallel with said semiconductor switch and connected between said switch's said first terminal and said second terminal.

17. A hazard prevention device for an electrical externally powered apparatus comprising:
   a housing, said housing having at least one opening and said housing comprising an electrical operating unit and a pair of spaced-apart electrically exposed electrically conductive probe networks, said pair being responsive to the entry of a conductive fluid electrically reducing the impedance between said probe networks of said pair;
   electrical source lines comprising at least one nonground electrical source line;
   a thermally actuated normally closed disconnect switch comprising at least one pair fo normally closed contacts and a fusible electrically conductive member, each said pair havng a first contact and a second contact, said first contact being electrically connected to an electrical source line connection, said second contact connected to an electrical connection of said apparatus, each said pair of contacts being held normally electrically-closed by means of mechanical bias provided by said fusible electrically conductive member, said member having two ends, a first end electrically connected to a nonground line of said electrical source lines, with at least each and every said first contact of each said pair of contacts which is associated with a respective nonground electrical source line being connected to its respective associated nonground electrical source line, said fusible member losing its mechanical bias ability to keep said contacts normally closed for each pair upon electrical activity between said ends of said member, causing termination of electrical conductivity between each and every said pair of said normally closed contacts;
   a trigger circuit comprising a semiconductor switch, said semiconductor switch having a first terminal, a second terminal, and a gate input, said first terminal connected to one of said ends of said fusible electrically conductive member of said normally closed disconnect switch, said second terminal electrically connected to one of said electrical source lines other than the electrical source line connected to said first terminal's associated end of said fusible member, and said gate input being excited only upon low impedance between said probe networks of said pair of probe networks, said semiconductor switch being electrically conductive between said first terminal and said second terminal only upon said gate input excitation;
   wherein entry of conductive fluid into said housing reduces said impedance between said probe networks of said pair causing said gate input excitation, which in turn causes said semiconductor switch to conduct between said first and second terminals, thereby providing electrical activity through said fusible member to cause said member to lose its ability to keep the normally closed mechanical bias and associated electrical conductivity between said first contact and said second contact of each pair of contacts, which in turn causes termination of electrical activity between each said pair of normally closed contacts of said thermally actuated normally-closed disconnect switch, thus preventing injury to living species.

18. A hazard prevention device as claimed in claim 17 wherein:
   one of said probe networks of said pair of networks is connected to said gate input of said semiconductor switch of said trigger circuit; and
   the other of said probe networks is connected to said nonground electrical source line.

19. The hazard prevention device as claimed by claim 17 wherein:
   each said pair of said thermally actuated normally closed disconnect switches further comprises a pre-stressed contact spring having a free end; and
   said fusible electrically conductive member holds said contact spring for each set of said contacts in a closed position to one of said contacts of each pair.

* * * * *